Jan. 23, 1945.  E. H. DELAHAN ET AL  2,368,007
METHOD OF FINISHING BEARING CUPS
Filed Feb. 15, 1941
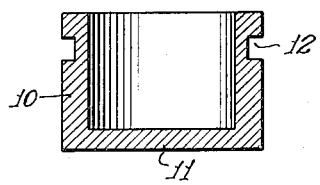
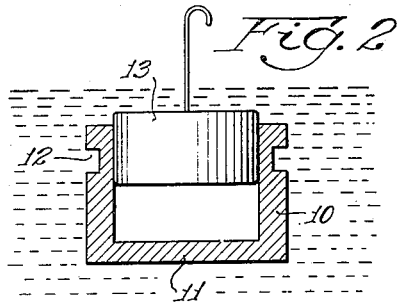
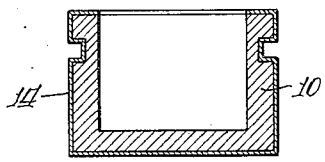
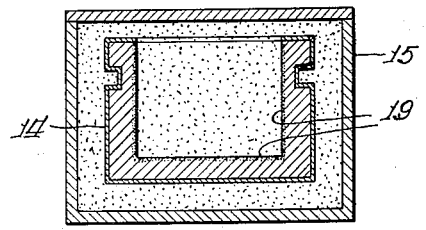
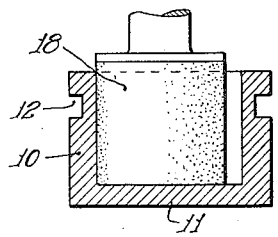
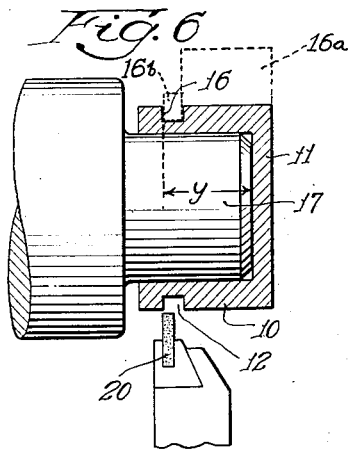
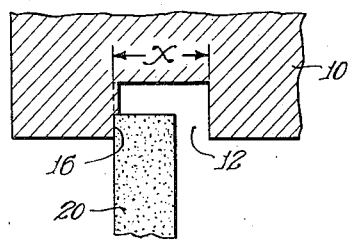
Inventors:
Edward H. Delahan
Albin G. Frojd
By: Edward C. Fritzbaugh
Atty.

Patented Jan. 23, 1945

2,368,007

UNITED STATES PATENT OFFICE 2,368,007

METHOD OF FINISHING BEARING CUPS

Edward H. Delahan and Albin G. Frojd, Rockford, Ill., assignors to Borg-Warner Corporation, Chicago, Ill., a corporation of Illinois Application February 15, 1941, Serial No. 379,048

3 Claims. (Cl. 29—149.5)

This invention relates to the manufacture of bearing cups for universal joints, of the type wherein a bearing cup is secured against radial escape under centrifugal force, in a cylindrical socket of a yoke member, by an annular securing element engaging against a seat formed in the periphery of the bearing cup.

The general purpose of the invention is to provide an improved method of finishing such a bearing cup so as to maintain a very accurate uniformity of tolerance in the spacing between the seat and the inner surface of the end wall of the cup. In the present day requirements of motor vehicle manufacturers, this tolerance must be maintained at or under .005 inches. This requirement has caused very serious difficulties in the manufacture of universal joint bearing cups, and the present invention greatly improves upon prior methods of maintaining this tolerance at the required minimum in the finishing of the bearing cups, by making it possible to machine the seat in relatively soft metal after the bearing surfaces have been hardened, thereby eliminating the distorting effect of the hardening step on the spacing between the seat and the inner end bearing surface, and yet permitting the use of a shaving tool for performing the seat facing operation in a rapid manner.

A further object of the invention is to provide a novel and improved apparatus for facing the securing element seat.

Other objects, the advantages and uses of the invention will become more apparent after reading the following specification and claims, and after consideration of the drawing forming a part of the specification, wherein:

Fig. 1 is an axial sectional view of a bearing cup in the form of a work piece formed to rough dimensions;

Fig. 2 is a view illustrating the plating of the work piece;

Fig. 3 is a view illustrating the plated work piece;

Fig. 4 is a view schematically illustrating the carburizing of the work piece to harden the interior of the cup;

Fig. 5 is a view illustrating the finishing of the interior surface of the cup;

Fig. 6 is a view illustrating the final step of shaving the snap ring seat; and

Fig. 7 is an enlarged detailed view illustrating the same step.

Our improved method of finishing a universal joint bearing cup embodies the following steps:

1. The bearing cup (indicated generally at 8) is fabricated to rough dimensions, in any suitable manner, as by turning from solid stock or by drawing or coining from heavy sheet metal. The cup 8 thus fabricated will be substantially as shown in section in Fig. 1, including a cylindrical lateral wall 10 and a flat end wall 11. During the turning operation, if employed, the groove 12 which receives the securing element (which may be in the form of an annular spring clip, commonly designated a snap ring), is rough turned in the exterior of the wall 10.

2. The mouth of the cup is then closed with a suitable plug 13 (Fig. 2), the cup is hung on a rack, and the rack is dipped into a solution which deposits copper plating 14 on the exterior surface of the walls 10 and 11, leaving the interior surfaces thereof unplated, or the cups may be placed in a wire basket and thus dipped in the plating solution.

3. The cups are then removed from the rack and the plugs are taken out.

4. The cups are then subjected to a suitable carburizing process in which the interior surfaces of the walls 10 and 11 are carburized as indicated at 19 while the exterior surfaces thereof remain unaffected due to the protective coating of copper.

5. Immediately after removing from the carburizing oven or bath 15 (Fig. 4), the cups are hardened by quenching.

6. The cup is then subjected to a finishing operation in which the interior and exterior cylindrical surfaces of the walls 10 are ground accurately by means of a grinding wheel 18 to finished dimensions, and the interior surface of the end wall 11 is lapped to its finished state. During this finishing operation, the copper plating is removed from the exterior of the walls 10 and 11.

7. The bearing cup is then inserted in the machine in which the last step of the method is carried out, this step comprising the facing of the snap ring seat 16 in the groove 12 by means of a shaving tool 20 (see Fig. 6) while the inner surface of the end wall 11 is maintained in locating contact with the end of a chuck 17 on which the bearing cup is mounted during this facing operation. Since the inner surface of the end wall 11 has previously been accurately finished, the finishing of the snap ring seat to a close tolerance in dimension between the seat and the inner surface of the end wall 11 depends upon the position of the tool 20 with which the facing is done, relative to said inner surface.

8. After a predetermined number of bearing cups have thus been finished, one of the finished cups is measured to determine the amount of deviation from the specified dimension between the seat and end wall 11, and the tool 14 is adjusted an amount sufficient to compensate for said deviation. Such testing and adjustment is performed periodically during the operation of the machine, and is necessary to compensate for tool wear.

Referring to Fig. 6, there has been indicated in dotted lines the position that the bearing cup will bear to a universal joint yoke 16a when installed therein including the manner in which the snap ring 16b cooperates with annular seat 16. The journal of the universal joint is not shown but will assume a position corresponding to that of the chuck 17. It will thus appear that the dimension $y$ indicating the distance between the side wall of annular seat 16 remote from the inner end of the bearing cup and the inner end of the bearing cup must be maintained to a close tolerance.

Our improved method makes it possible to face the seat 16 by a shaving operation, which is much faster and less expensive than the grinding operation. If the seat is to be faced in hardened material, a grinding operation is necessary. If the seat is faced prior to the hardening operation, the latter will distort the dimension between the seat and the inner end surface of the cup. Extreme accuracy in the dimension X between the inner surface of the end wall and the seat 16 is obtained by leaving the exterior of the cup unhardened and performing the seat facing step as a final operation after the cup has been hardened and the inner surface thereof finished by grinding, the cup being located against the end of the chuck 17 so as to determine the dimension X.

We claim:

1. The method of fabricating universal joint bearing cups having an annular seat formed in the external surface thereof adapted for cooperation with a snap ring securing element, it being important that extreme accuracy be maintained in the spacing of the inner terminal surface of said cup with reference to the wall of said annular seat, said method including the steps of: forming a cup-shaped bearing with a snap ring groove therein, plugging the mouth of said cup for protecting the interior surfaces thereof against contact with the plating solution, immersing said cup in a plating solution and plating the exterior thereof, unplugging the mouth of said cup and carburizing the interior thereof, machining the inner terminal surface of said cup to final finished shape to provide an accurate locating surface, locating the inner terminal surface with relation to the snap ring groove and machining the seat portion of the snap ring groove to an accurately spaced relationship with reference to the inner terminal surface of the bearing cup.

2. The method of fabricating a universal joint bearing cup having an external annular groove formed therein for the reception of a securing snap ring element and in which extreme accuracy is required between the inner terminal surface of said cup and the seating surface for said snap ring, said method including the steps of: forming the cup to rough dimensions with a snap ring groove in the outer periphery thereof, providing the interior of the cup with a hardened bearing surface including a hardened inner terminal surface, while leaving the exterior of the cup unhardened, subsequently positioning said cup with reference to said inner hardened terminal surface thereof, machining the snap ring seating surface of said annular groove to give the same a selected precise spaced location with reference to said inner terminal locating surface whereby the snap ring when positioned within said annular seating surface in contact with the associated supporting yoke will be effective to confine said cup properly with reference thereto.

3. The method of fabricating a universal joint bearing cup having an external annular snap ring receiving seat therein, said method including the steps of: forming a cup-shaped bearing with a snap ring groove, plugging, plating, removing the plug and carburizing the interior of said cup, simultaneously finish machining the inner and outer cylindrical surfaces of said cup and the inner terminal portion to final shape, to provide said inner terminal surface as a locating surface, locating the inner cylindrical and inner terminal surface accurately in relation to the snap ring groove and shaving the snap ring seat portion to an accurately spaced relationship with reference to the inner terminal surface of the bearing cup.

EDWARD H. DELAHAN.
ALBIN G. FROJD.